T. T. SHAWCROSS.
Seed Planter.
No. 58,557.
2 Sheets—Sheet 2.
Patented Oct. 2, 1866.
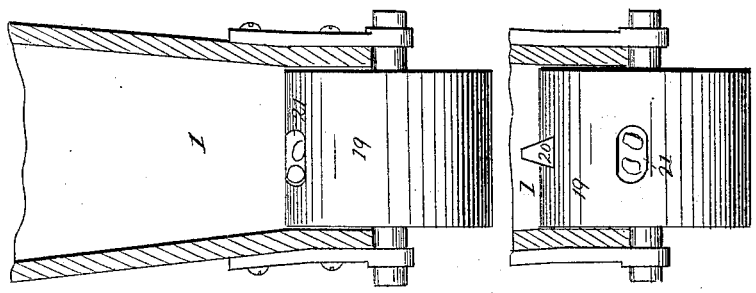
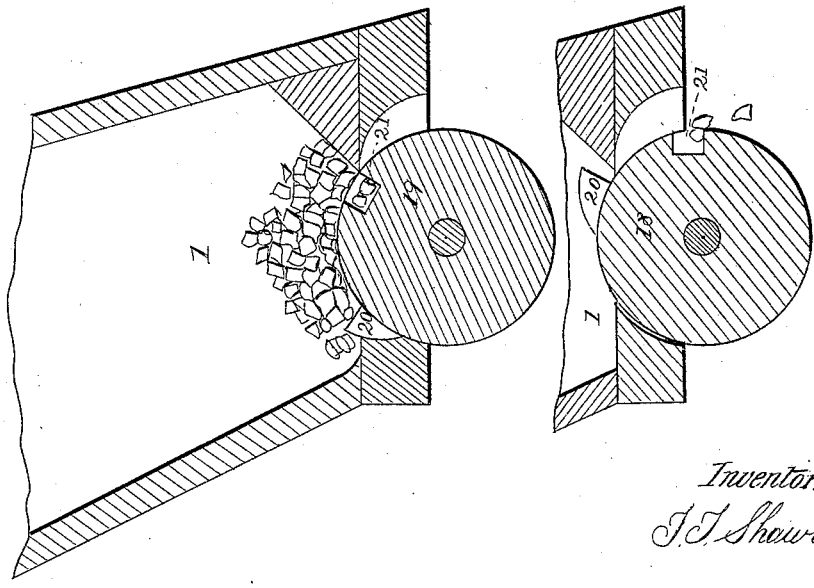
Witnesses.
Inventor.

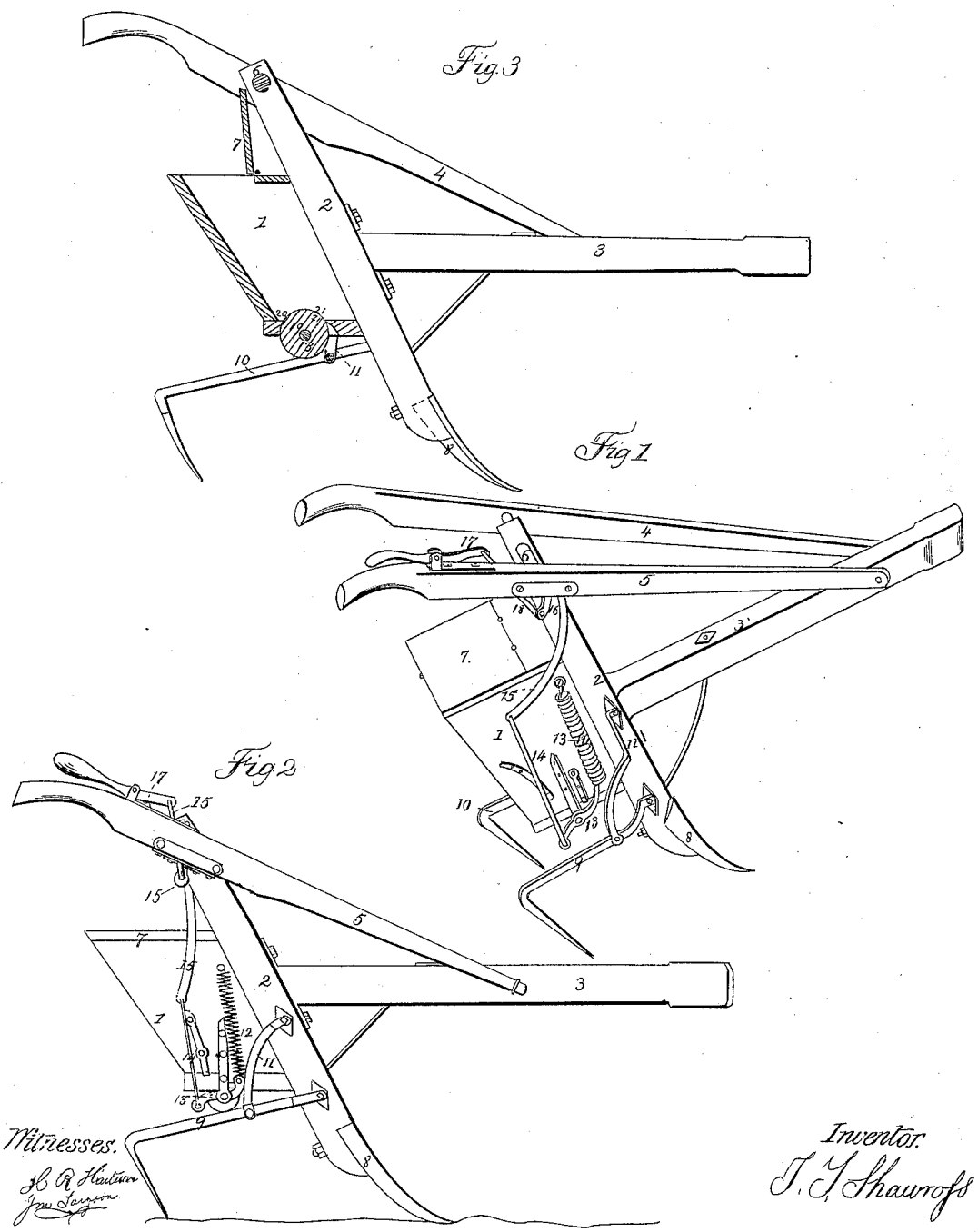

UNITED STATES PATENT OFFICE.

T. T. SHAWCROSS, OF ALLISONVILLE, INDIANA, ASSIGNOR TO HIMSELF, L. D. WYATT, AND E. D. McMANAMA, OF SAME PLACE.

IMPROVEMENT IN CORN-PLANTERS.

Specification forming part of Letters Patent No. 58,557, dated October 2, 1866.

*To all whom it may concern:*

Be it known that I, T. T. SHAWCROSS, of Allisonville, Marion county, State of Indiana, have invented a new and useful manner of planting corn, called "Superior Corn-Planter;" and I do hereby declare that the following is a clear and exact description thereof, reference being had to the annexed drawings, and to the letters of reference marked thereon.

Figure 1 represents a persective view; Figs. 2 and 3, side views, and Fig. 4 details.

The nature of my invention consists in constructing the box 1 with a bottom, so fixed that I can put a little wheel in such a position that it will play between the inside and outside of that box 1. 19 is the wheel. This wheel I supply with a cavity of the size to hold from three to five grains. This wheel is also supplied with an agitator, 20. Attached to the axle of this wheel 19 is a lever, 13, with a spring-fulcrum, 12. This lever 13 is connected by means of rods with a right-hand plow-handle, from where the wheel is turned by means of the little lever 17 on top of the plow-handle.

When the box 1 is filled with corn, and the wheel 19 is set in motion by means of the lever 17, the cavity 21 in the wheel 19 fills itself with corn. This corn passes out of the box by the pressure of the lever 17, and drops onto the ground that moment the spring 12, acting on the lever 13, forces the lever back to its primitive position, and thereby turns the wheel 19 back to its first place, but empty. During this process the agitator has performed his duty in passing through the corn in the box in such a manner as to prevent it from choking up the passage.

What I claim, and desire to secure by Letters Patent of the United States, is—

1. The box 1, the wheel 19, with its cavity 21, and the agitator 20.

2. The spring 12, levers 13, 14, 15, 16, 18, and 17, all arranged and operating substantially as described, for that purpose.

T. T. SHAWCROSS.

Witnesses:
H. R. HUEBNER,
J. W. LOEPER.